United States Patent [19]

Miyazawa

[11] Patent Number: 4,661,860
[45] Date of Patent: Apr. 28, 1987

[54] IMAGE READER FOR IMAGE PROCESSING APPARATUS

[75] Inventor: Hideyuki Miyazawa, Kawasaki, Japan

[73] Assignee: Ricoh Company, Ltd., Tokyo, Japan

[21] Appl. No.: 796,730

[22] Filed: Nov. 12, 1985

[30] Foreign Application Priority Data

Nov. 16, 1984 [JP] Japan ................... 59-240498

[51] Int. Cl.⁴ .................. H04N 3/14; H04N 1/024
[52] U.S. Cl. .................................. 358/294; 358/213.29
[58] Field of Search ................... 358/212, 294, 213

[56] References Cited

U.S. PATENT DOCUMENTS

| | | | |
|---|---|---|---|
| 4,453,187 | 6/1984 | Komiya et al. | 358/213 |
| 4,499,384 | 2/1985 | Segawa et al. | 358/213 |
| 4,500,927 | 2/1985 | Ozawa | 358/294 |
| 4,584,607 | 4/1986 | Miyazawa | 358/294 |

FOREIGN PATENT DOCUMENTS 56-78279  6/1981  Japan ................... 358/213

Primary Examiner—Gene Z. Rubinson
Assistant Examiner—Stephen Brinich
Attorney, Agent, or Firm—Oblon, Fisher, Spivak, McClelland & Maier

[57] ABSTRACT

An image reader for a facsimile apparatus or like image processing apparatus which uses a line image sensor. An array of photodiodes arranged in the line image sensor and switches serially connected in one-to-one correspondence with the photodiodes are divided into a plurality of blocks. These blocks are further divided into a plurality groups. Selection switches are associated one with each of the groups and have their output terminals commonly connected group by group. The common output terminals of the selection switches are connected to different input terminals of differential amplifiers, so that a block to be read and another block which is different in group from that block are simultaneously selected by the selection switches.

4 Claims, 9 Drawing Figures

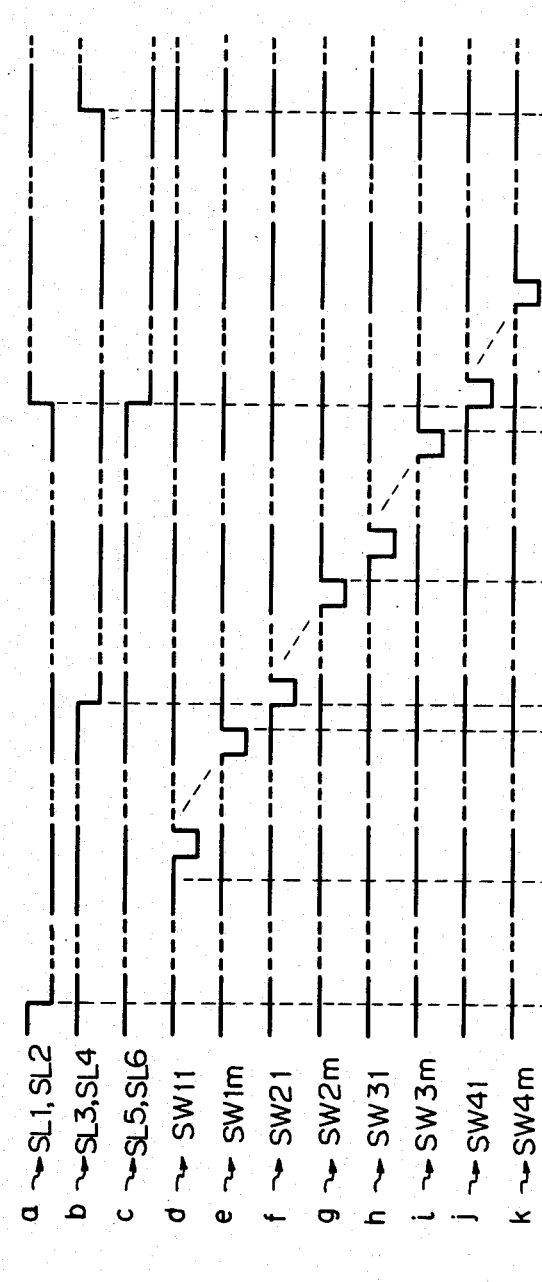

IMAGE READER FOR IMAGE PROCESSING APPARATUS

BACKGROUND OF THE INVENTION

The present invention relates to an image reader for a facsimile apparatus or like image processing apparatus and, more particularly, to an image reader capable of preventing noise from being introduced in image signals and, thereby, improving the signal-to-noise (S/N) ratio by use of a store type amorphous silicon line image sensor.

Image reading means heretofore installed in an image processing apparatus is implemented with a line image sensor, as in an image reader section of a facsimile terminal. The line image sensor is constructed and arranged to photoelectrically transduce one line of images on a pixel basis. Generally, a line image sensor comprises a light-sensitive section where a plurality of light-sensitive cells such as photodiodes are arranged in an array, and a drive section adapted to sequentially select and deliver output signals of the light-sensitive cells. Recently, a so-called store type amorphous silicon line image sensor has been put to practical use which has as its light-sensitive cells photodiodes that are made of amorphous silicon. In an image reader of the kind using a store type amorphous silicon line image sensor, since the light-sensitive surface of each cell can be dimensioned as small as an actual pixel, images on a document need only to be focused in their actual size onto the line image sensor. This advantage leads to a small-size image reader construction.

A basic construction of such a store type amorphous silicon line image sensor is shown in FIG. 1.

In the illustrated image sensor, generally 10, a capacitance Cd represents a coupling capacitance of a photodiode, or light-sensitive cell, PD, while $C_L$ represents a capacitance developing in a wiring between the photodiode PD and a circuit to follow (e.g. amplifier). A resistor R is a current-limiting resistor adapted to read out an output. A source voltage $V_D$ is applied via the resistor A. A switch SW for charging the photodiode PD comprises a MOS (metal oxide semiconductor) switch or like semiconductor element.

Assume that the switch SW is turned on to charge the capacitances Cd and $C_L$ and then turned off to set up an image signal storing condition. In this condition, a photocurrent Ip complementary to a quantity of received light, i.e., a pixel luminance associated with a read image, develops in the photodiode PD to gradually discharge the capacitance Cd. When the switch SW is turned on again, the photodiode PD produces an output voltage Vout which based on charge conservation is expressed as:

$$V_{out} = V_D - (Ip \cdot T/(Cd + C_L)) \qquad \text{Eq. (1)}$$

where T is the interval between consecutive turnons of the switch SW, or image information storing period.

Meanwhile, in the case where the whole charge stored in the capacitance Cd is discharged by the photocurrent Ip which has flown over the storing time T, the output voltage Vout of the photodiode, or saturation output Vsat, is produced by:

$$V_{sat} = C_L \cdot V_D/(C_L + Cd) \qquad \text{Eq. (2)}$$

Hence, the output Vout of the photodiode PD varies from the source voltage $V_D$ to Vsat complementarily to the photocurrent Ip which has flown over the storing time, i.e. luminance of the associated pixel. In this manner, image signals corresponding to pixel densities are provided.

The store type amorphous silicon line image sensor may be designed to read an A4 format document, which has a reading width of 216 millimeters, eight dots per millimeter by way of example. In this type of image sensor, 1728 photodiodes PD each having a light-sensitive area substantially equal in dimensions to a pixel are arranged at equal intervals in correspondence with the reading width; switches SW are connected in one-to-one correspondence and serially to the photodiodes PD. Where this type of line image sensor is driven as a single element, the capacitance $C_L$ increases to a significant level. The Eq. (2) teaches that an increase in the capacitance $C_L$ is reflected by a decrease in the level of the saturation output Vsat which in turn narrows the available dynamic range.

An implementation heretofore employed to preserve a desirable dynamic range consists in dividing the light-sensitive cells of a line image sensor into a plurality of blocks and driving them on a block basis. An example of such a prior art arrangement is shown in FIG. 2. In the illustrated example, photodiodes PD and switches SW are divided into n discrete blocks BL1 to BLn each having m photodiodes and m switches. For example, 1728 combinations of photodiode PD and switch SW are divided into twenty-seven blocks by sixty-fours. The outputs from the blocks BL1 to BLn are coupled to an amplifier AM via selection switches SL1 to SLn.

As represented by waveforms a to i in FIG. 3, the selection switches SL1, SL2, ..., SLn, and the switches SW11 to SW1m, ..., SWn1 to SWnm are operated by a controller, not shown, to produce one line of image signals Va. In FIG. 3, the logical "L" level represents the "on" state of each switch. First, after the selection switch SL1 associated with the block BL1 has been turned on, the switches SW11 to SW1m are sequentially turned on each for a charging period so as to apply output signals of the respective photodiodes PD to the amplifier AM. As the block BL1 is fully read out, the selection switch SL1 is turned off and, instead, the selection switch SL2 is turned on to read the next block BL2. Thereafter, the same procedure is sequentially repeated on the other blocks down to BLn.

The problem with the prior art arrangement as discussed above is that since the image signals Va are very weak signals such as on the order of 10 millivolts, they are noticeably effected by about several millivolts of switching noise NZ which is generated every time each of the switches SW is turned on and off (see waveform i of FIG. 3). The prior art image reader, therefore, accomplishes only a limited S/N ratio. In addition, switching noise entailed by the actions of the selection switches SL1 to SLn also has substantial influence on the image signals Va.

SUMMARY OF THE INVENTION

It is therefore an object of the present invention to provide an image reader for an image processing apparatus which eliminates the drawback particular to the prior art device as discussed above.

It is another object of the present invention to provide an image reader for an image processing apparatus which frees image signals from the influence of noise to thereby increase the S/N ratio of image signals.

It is another object of the present invention to provide a generally improved image reader for an image processing apparatus.

In accordance with one aspect of the present invention, there is provided an image reader for an image processing apparatus in which an array of light-sensitive cells arranged in a line image sensor are divided into a predetermined number of blocks and the blocks are divided into at least a first and a second groups in the order of arrangement, the blocks being sequentially selected and driven. The image reader comprises block selectors associated in one-to-one correspondence with the blocks for selecting any one of the blocks in the groups and sequentially driving the cells in the selected block, a first common terminal to which output terminals of all the block selectors which belong to the first group are commonly connected, a second common terminal to which output terminals of all the block selectors which belong to the second group are commonly connected, a first differential amplifier having a non-inverting input terminal connecting to the first common terminal and an inverting input terminal connecting to the second common terminal, thereby producing a first output by subtracting an output of the second group from an output of the first group, a second differential amplifier having a non-inverting input terminal connecting to the second common terminal and an inverting input terminal connecting to the first common terminal, thereby producing a second output by subtracting an output of the first group from an output of the second group, and output selectors for exclusively selecting the first and second outputs to deliver the selected output as an image signal. The block selectors are constructed to simultaneously select one of the blocks and another block which is different in group from that one block for reading out image signals, whereby switching noise is removed.

In accordance with another aspect of the present invention, there is provided an image reader for an image processing apparatus in which an array of light-sensitive cells arranged in a line image sensor are divided into a predetermined number of blocks and the blocks are divided into at least a first, a second, a third and a fourth groups in the order of arrangement, the blocks being sequentially selected and driven. The image reader comprises block selectors associated in one-to-one correspondence with the blocks for selecting any one of the blocks of the groups and sequentially driving the cells in the selected block, a first common terminal to which output terminals of all the block selectors belonging to the first group are commonly connected, a second common terminal to which output terminals of all the block selectors belonging to the second group are connected, a third common terminal to which output terminals of all the block selectors belonging to the third group are connected, a fourth common terminal to which output terminals of all the block selectors belonging to the fourth group are connected, a first differential amplifier having a first input terminal connecting to the first common terminal and a second input terminal connecting to the second common terminal, thereby producing a first output by subtracting an output of the second group from an output of the first group and a second output by subtracting an output of the first group from an output of the second group, a second differential amplfier having a first input terminal connecting to the third common terminal and a second input terminal connecting to the fourth common terminal, thereby producing a third output by subtracting an output of the fourth group from an output of the third group and a fourth output by subtracting an output of the third group from an output of the fourth group, and output selectors for exclusively selecting the first to fourth outputs to deliver the first to fourth outputs as image signals. The block selectors are constructed to switch the blocks belonging to the third and fourth groups while the blocks belonging to the first and second groups are selected to read out image signals, and to switch the blocks belonging to the first and second groups while the blocks belonging to the third and fourth groups are selected to read out image signals, whereby noise due to switching is removed.

The above and other objects, features and advantages of the present invention will become more apparent from the following detailed description taken with the accompanying drawings.

BRIEF DESCRIPTION OF THE DRAWINGS

FIGS. 7A-7B show waveforms representative of the operation of the image reader shown in FIG. 6.

DESCRIPTION OF THE PREFERRED EMBODIMENTS

While the image reader for an image processing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
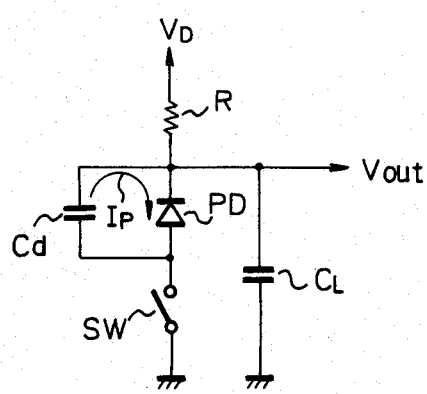
FIG. 1 shows an equivalent circuit which is representative of a basic construction of a store type amorphous silicon image sensor.
Figure 2:
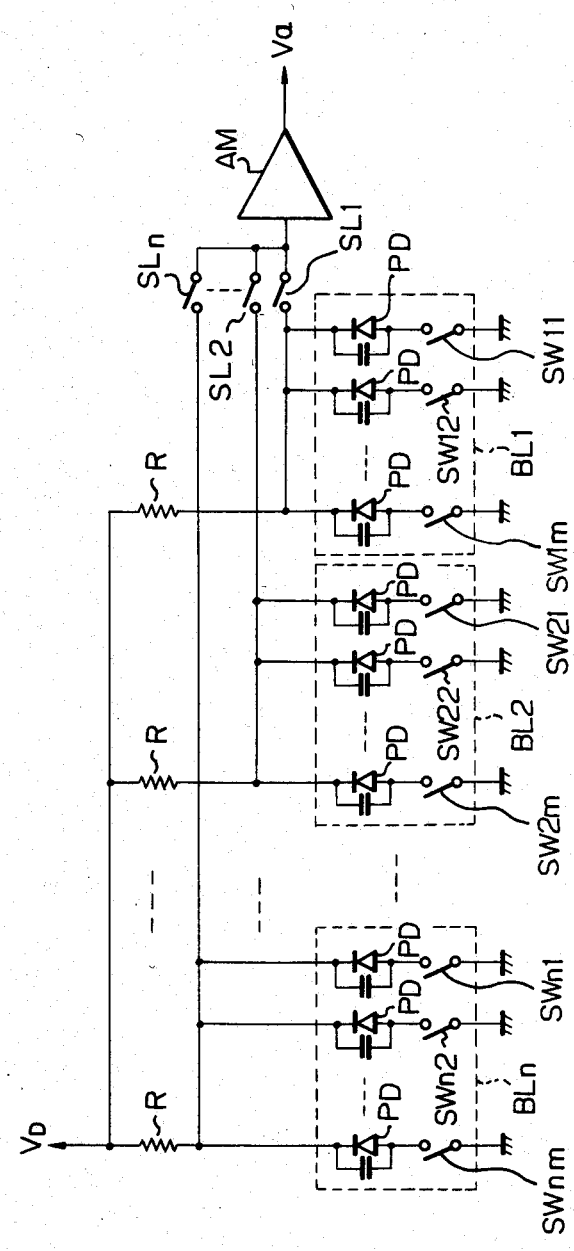
FIG. 2 is a block diagram of a prior art image reader.
Figure 3:
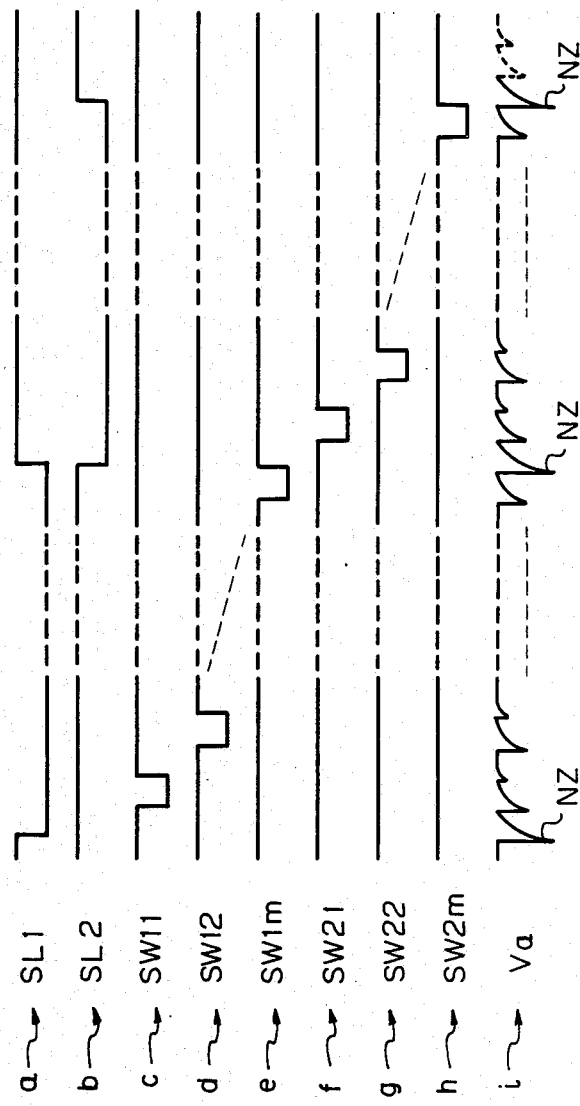
FIG. 3 shows waveforms demonstrating the operation of the image reader shown in FIG. 2.
Figure 4:
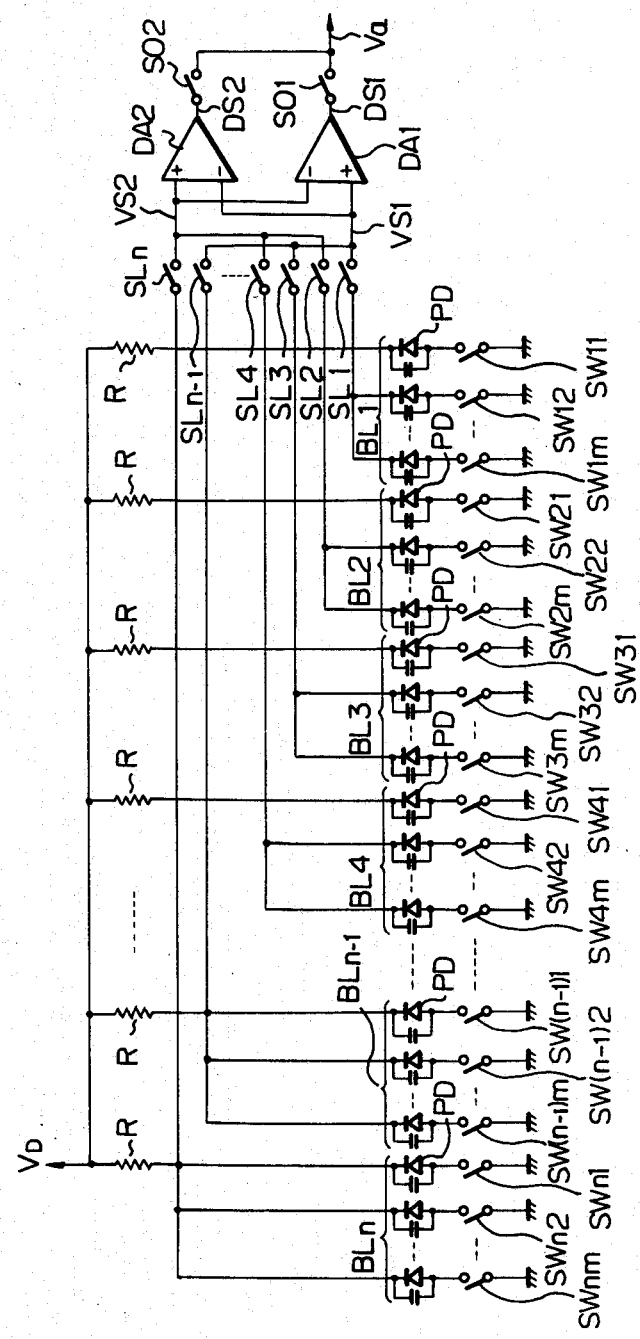
FIG. 4 is a circuit diagram showing an image reader in accordance with the present invention.

Referring to FIG. 4, an image reader embodying the present invention is shown. In FIG. 4, the same or similar structural elements as those shown in FIG. 2 are designated by like reference numerals and will not be described in detail.

As shown, photodiodes PD which constitute a line image sensor and switches SW associated in one-to-one correspondence with the photodiodes PD are divided into n blocks BL1 to BLn each having m photodiodes PD and m switchs SW. A source voltage $V_D$ is connected via a resistor R to each of the blocks BL1 to BLn. Here, n is an even number; if the total number of the photodiodes PD is 1728, for example, then m is 32 and n, 54. The outputs of the blocks BL1 to BLn respectively are connected to selection switches SL1 to SLn. Among the selection switchs SL1 to SLn, odd ones SL1, SL3, . . . , SLn−1 have their output terminals commonly connected and so do even ones SL2, SL4, . . . , SLn. While a signal VS1 appearing at the point of common connection of the odd selection switches SL1, SL3, . . . , SLn−1 is applied to a non-inverting input terminal of a differential amplifier DA1 and an inverting input terminal of a differential amplifier DA2, a signal VS2 appearing at the point of common connection of the even selection switches SL2, SL4, ..., SLn is applied to an inverting input terminal of the differential amplifier DA1 and a non-inverting input terminal of the differential amplifier DA2. In this construction, the amplifier DA1 produces a signal DS1 by subtracting the signal VS2 from the signal VS1, and the amplifier DA2 a signal DS2 by subtracting the signal VS1 from the signal VS2. The signals DS1 and DS2 are delivered to output switches SO1 and SO2, respectively. The output switches SO1 and SO2 have their output terminals commonly connected and are exclusively operated. Signals appearing at the common output terminal of the switches SO1 and SO2 are routed as image signals Va to a device which follows the image reader (e.g. binarizer or DC regenerator).

Figure 5A:
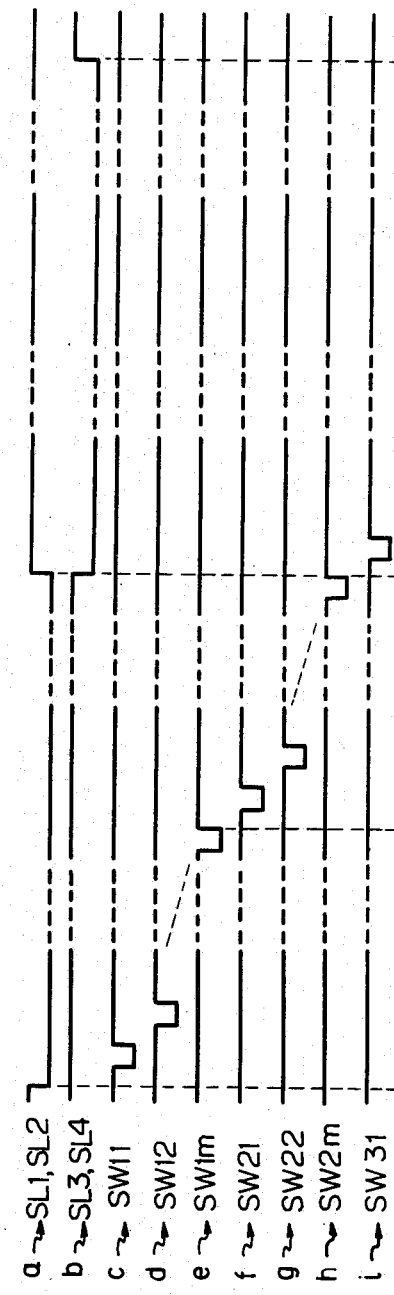
FIGS. 5A-5B show waveforms demonstrating the operation of the image reader of FIG. 4.
Figure 5B:
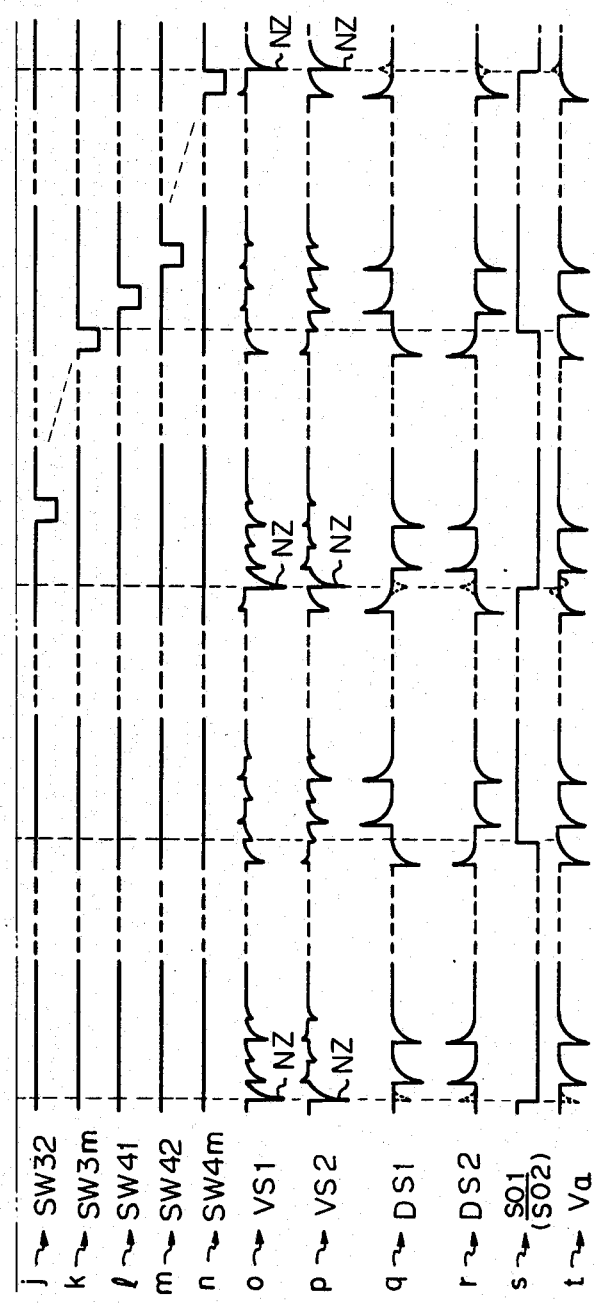

The switches SW11 to SWnm, the selection switches SL1 to SLn, and the output switches SO1 and SO2 are controlled by a controller, now shown, as represented by waveforms a to t in FIG. 5. The controller may comprise a microprocessor and its peripheral circuits. Specifically, the control begins with turning on the selection switches SL1 and SL2 at the same time and, thereby, selecting the blocks BL1 and BL2 through the switches SL1 and SL2 (see waveform a of FIG. 5). Since this is the start of a scanning, the output switch SO1 is turned on and the output switch SO2 is turned off to deliver an output from the block BL1 as an image signal. Upon the lapse of a delay time which is long enough to remove switching noise generated by the selection switches SL1 and SL2, the switch SW11 is turned on for a charging period (see waveform c of FIG. 5). Consequently, there appears on the line VS1 a composite signal of an output of the photodiode PD, which is selected by the switch SW11, and switching noize NZ due to the turnon of the switch SW11 (see waveform q of FIG. 5), and on the line VS2 only the switching noise NZ (see waveform p of FIG. 5).

The differential amplifier DA1 subtracts the switching noise due to the turnon of the switch SW11 from the composite signal of the output of the selected photodiode PD and the switching noise, thereby producing the output of the selected photodiode PD at the output line DS1 (see waveform q of FIG. 5). Appearing at this instant at the output line DS2 of the differential amplifier DA2 is an inverted version of the signal DS1 (see waveform r of FIG. 5). Since the output switch SO1 has been turned on, the signal DS1 is fed to the following device as an image signal Va.

As the switch SW11 is turned off, the next switch SW12 is turned on for a charging time upon the lapse of the previously mentioned delay time. Then, an output signal of the photodiode PD selected by the switch SW12 is fed to the next device as an image signal Va in the same manner as described above.

Thereafter, the switches SW13 to SW1m are sequentially turned on and off at the above-described timings.

At the timing when the last switch SW1m in the block BL1 is turned off, the output switch SO1 is turned off and the output switch SO2 is turned on, thereby selecting an output signal DS2 of the differential amplifier DA2 as an image signal Va. Also, the switches SW21 to SW2m are sequentially turned on and off after the switch SW1m and at the same timings as the switches SW11 to SW1m.

In this manner, the block BL2 is selected after the block BL1 so that image signals associated with the block BL2 are sequentially produced. At the instant when the last switch SW2m in the block BL2 has been turned off, the selection switches SL1 and SL2 are turned off and the selection switches SL3 and SL4 are turned on to select the blocks BL3 and BL4 (see waveform b of FIG. 5). Further, the output switch SO2 is turned off and the output switch SO1 is turned on, so that output signals associated with the block BL3 may be selected first.

In the above condition, the switches SW31 to SW3m are sequentially turned on and off after the switch SW2m and at the same timings as the switches SW11 to SW1m. As a result, signals output from the photodiodes PD in the block BL3 are separated by the differential amplifier DA1 and delivered therefrom as image signals Va (see waveform g of FIG. 5). At the timing when the last switch SW3m of the block BL3 is turned off, the output swith SO1 is turned off and the output switch SO2 is turned on to select output signals DS2 of the differential amplifier DA2 as image signals Va (see waveform r of FIG. 5). The switches SW41 to SW4m are turned on and off after the switch SW3m and at the same timings as the switches SW11-SW1m. In this manner, the blocks BL3 and BL4 are sequentially selected after the blocks BL1 and BL2 so that their associated image signals are sequentially produced.

Timed to the turnoff of the last switch SW4m which belongs to the block BL4, the selection switches SL5 and SL6 associated with the blocks BL5 and BL6 are turned on so that the switches SW51 to SW5m and the switches SW61 to SW6m are sequentially turned on and off after the switch SW4m and at the same timings as the switches SW11-SW1m. As a result, image signals from the blocks BL5 and BL6 are sequentially outputted after those from the block BL4. Such a procedure is performed with each of the remaining blocks BL7 to BLn to sequentially produce one line of image signals Va. Specifically, as consecutive two of the selection switches SL7 to SLn are turned on and off at the same time to select a signal readout block and a switching noise detection block out of the blocks BL7 to BLn, the switches SW71 to SW7m, ..., SWn1 to SWnm are sequentially turned on and off at the same timings as the switches SW11 to SW1m and the output switches SO1 and SO2 are turned on and off to sequentially deliver image signals from the blocks BL7 to BLn.

As described above, signals which are free from switching noise generated by the SW11 to SWnm are applied to the following device as image signals Va. It will be seen that the image signals Va are also free from the influence of switching noise generated by the selection switches SL1 to SLn because the switches SW11 to SWnm are turned on each with a delay time immediately after the actions of the selection switches SL1 to SLn.

While the number n has been shown and described as being an even number, the illustrative embodiment is practicable even if the number n is odd. In that case, an arrangement may be made such that signals associated with the last block are read out by simultaneously turning on any other block which belongs to the other group, e.g. nearby block. Further, the number of groups is not limited to two.

Now, the switching noise due to turnon and turnoff of the selection switches SL1 to SLn sometimes differ from one of nearby blocks to the other. The difference in switching noise may appear in the output signals DS1 and DS2 of the differential amplifiers DA1 and DA2 as indicated by phantom lines in the waveforms q and r of FIG. 5. The difference shows itself immediately before and after the on- and off-timings of the output switches SO1 and SO2 and possibly effects the video signals Va, although it is not directly introduced in the image signals Va.

Figure 6:
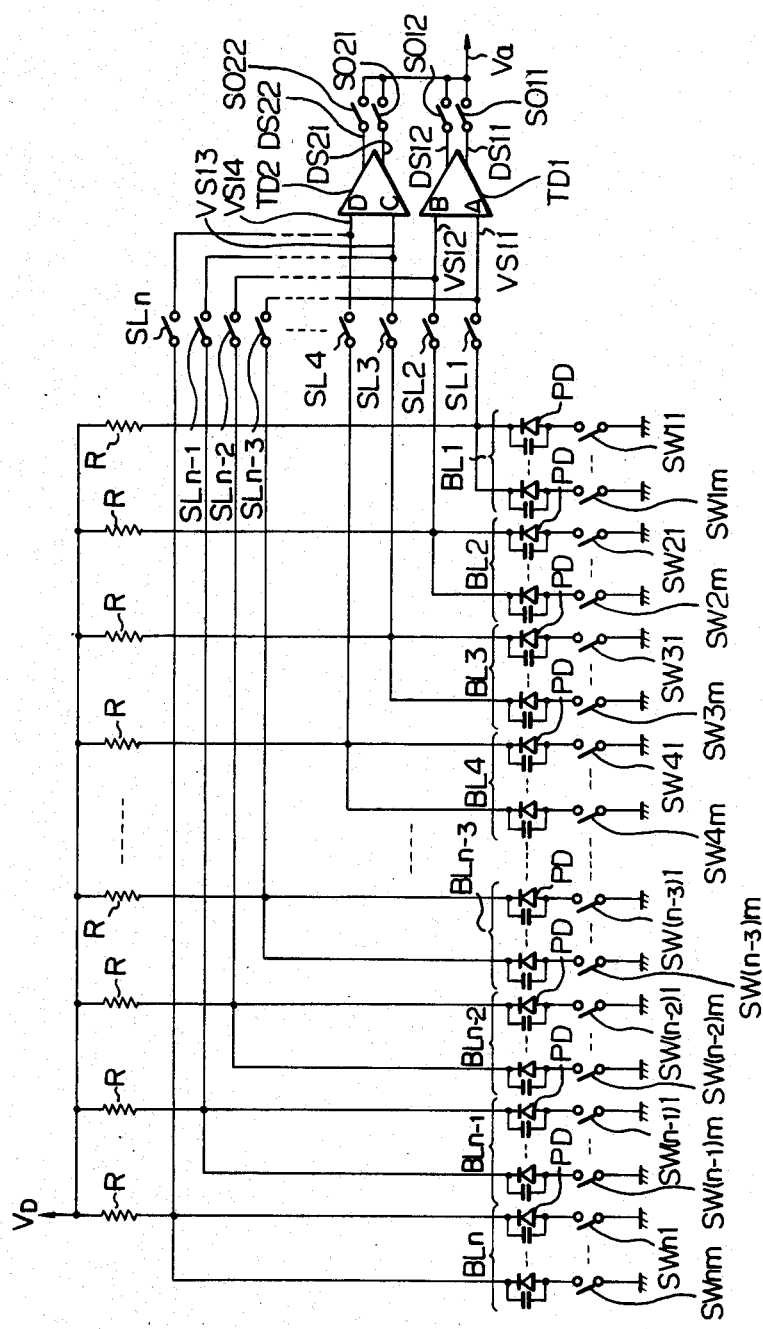
FIG. 6 is a circuit diagram showing another embodiment of the present invention.
Figure 7B:
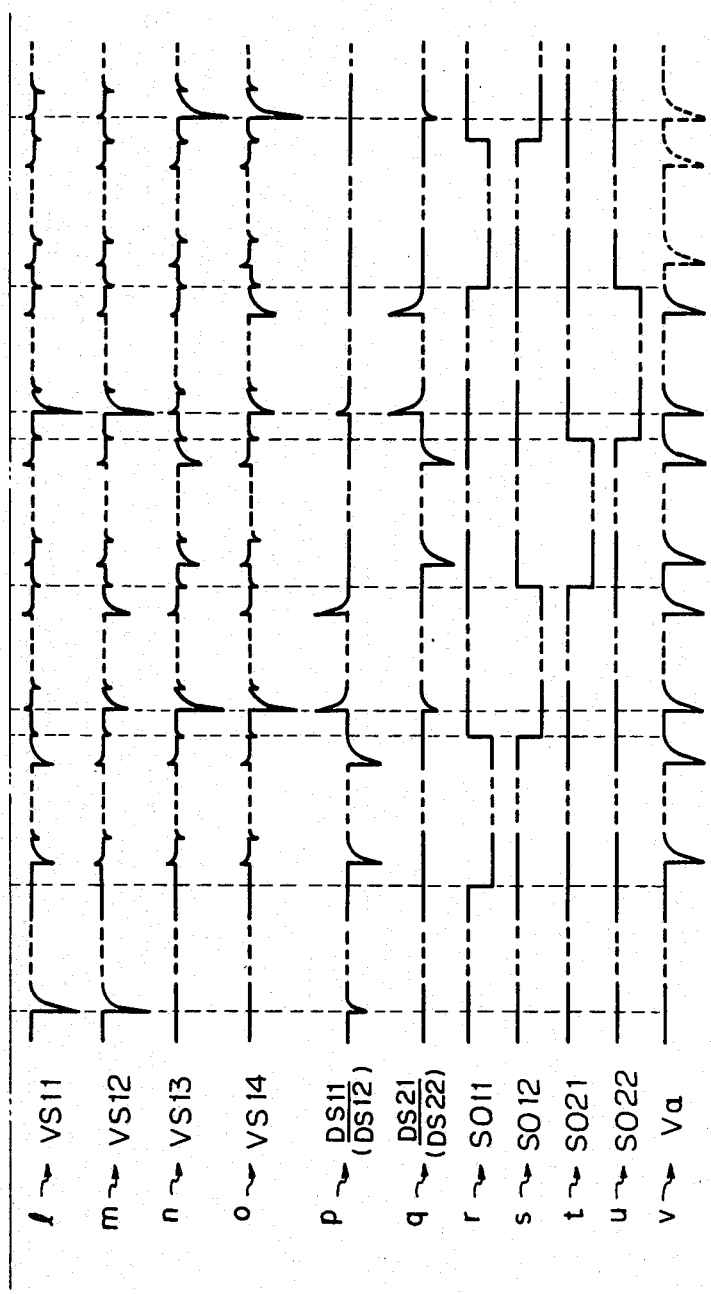

Referring to FIGS. 6 and 7, another embodiment of the present invention which eliminates the above occurrence is shown. In FIGS. 6 and 7, the same or similar structural elements as those shown in FIGS. 2 and 4 are designated by like reference numerals. The photodiodes PD and the switches SW for selecting the photodiodes PD are divided into n blocks BL1 to BLn by m's as previously stated. The source voltage $V_D$ is applied to each of the blocks BL1 to BLn via the resistor R. In this particular embodiment, n is a multiple of 4; if the total number of photodiodes is 1728, then m is 27 and n is 64. Among the selection switches SL1 to SLn, those switches SL1, SL5, . . . , SLn−3 which are divisible by 4 with remainder 1 have their output terminals commonly connected and so do those switches SL2, SL6, . . . , SLn−2 which are divisible by 4 with remainder 2, those switches SL3, SL7, . . . , SLn−1 which are divisible by 4 with remainder 3, and those switches SL4, SL8, . . . , SLn which are divisible by 4 with remainder 0. Signals VS11, VS12, VS13 and VS14 which appear at the points of common connection of such switches respectively are applied to input terminals A and B of a differential amplifier TD1 and input terminals C and D of a differential amplifier TD2 as illustrated.

Each of the differential amplifiers TD1 and TD2 produces two different differential signals in parallel relation. Specifically, the amplifier TD1 produces a signal DS11 by subtracting the signal VS12 from the signal BS11 and a signal DS12 by subtracting the signal VS11 from the signal DS12, while the amplifier TD2 produces a signal DS21 by subtracting the signal VS14 from the signal VS13 and a signal DS22 by subtracting the signal VS13 from the signal VS14. The signals DS11, DS12, DS22 and DS22 are delivered to output switches SO11, SO12, SO21 and SO22, respectively. It will be noted that the differential amplifiers TD1 and TD2 include respectively two differential amplifiers DA1 and two differential amplifiers DA2 which are shown in FIG. 4 and may naturally be implemented with four differential amplifiers which are identical in construction with the differential amplifier DA1 or DA2. All the four output switches SO11, SO12, SO21 and SO22 are commonly connected at their output terminals. Signals appearing at their common output terminal are applied as image signals to a device which follows the image reader (e. g. binarizer or DC regenerator).

The switches SW11 to SWnm, the selection switches SL1 to SLn and the output switches SO11, SO12, SO21 and SO22 are controlled by a controller, not shown, at the timings which are indicated in waveforms a to v in FIG. 7. Specifically, the selection switches SL1 and SL2 are turned on first, thereby selecting the blocks BL1 and BL2 (see waveform a of FIG. 7). Then, upon the lapse of a predetermined time (substantially a one-block readout time), the output switch SO11 is turned on to select an output signal DS11 of the differential amplifier TD1 and, at the same time, the on-off control over the switches SW11 to SW1m is initiated (see waveform r of FIG. 7). In this construction, output signals associated with the block BL1 which appear as image signals Va are free from switching noise generated by the switches SW11 to SW1m. After the block BL1 has been fully scanned, the selection switches SL3 and SL4 are turned on to simultaneously select the blocks BL3 and BL4 which are to be controlled next. At this instant, the output switch SO11 is turned off and the output switch SO12 is turned on to select an signal DS12 of the differential amplifier TD1. At the same time, on-off control over the switchs SW21 to SW2m is started after the switch SW1m.

In the manner described, at the instant when the block is switched from BL1 to BL2, the selection switches SL3 and SL4 are turned on to select the blocks BL3 and BL4 which are to be selected next. Here, since the output switch SO11 or SO12 has already been turned on, switching noise due to the actions of the selection switches SL3 and SL4 are prevented from being mixed with the image signals Va. This does not bring about any degradation of the S/N ratio.

Subsequently, the switches SW21 to SW2m, SW31 to SW3m and SW41 to SW4m are each on-off controlled as previously discussed in relation to the first embodiment, while the output switches SO12, SO21 and SO22 are on-off controlled timed to the selection of the blocks BL2 to BL4. As a result, image signals from the blocks BL2 to BL 4 are sequentially delivered after those from the block BL1. At this instant, the selection switches SL1 and SL2 are turned off and the selection switches SL5 and SL6 are turned on each at the timing when the block is switched from BL3 to BL4. Again, since the output switch SO21 or SO22 has been turned on, the image signals Va are successively isolated from the switching noise which is entailed by the actions of the selection switches SL5 and SL6.

By the same procedure, the switches SW51 to SW5m, SW61 to SW6m, . . . , SWn1 to SWnm, the selection switches SL5 to SLn and the output switches SO11, SO12, SO21 and SO22 are individually controlled, so that one line of image signals Va are applied to the following device. Specifically, while those blocks to which numbers which are divisible by 4 with residuals 1 and 2 are assigned are selected to read out image signals, those blocks with numbers which are divisible by 4 with residuals 3 and 0 are switched. Conversely, while the blocks with numbers which are divisible by 4 with residuals 3 and 0 are selected to read out image signals, the blocks which are divisible by 4 with residuals 1 and 2 are switched. When image signals are to be read out of the blocks which are divisible by 4 with residuals 1, 2, 3 and 0, the output switches SO11, SO12, SO21 and SO22 respectively are turned on.

As described above, when any one of the selection switches SL1 to SLn is to be operated, output signals of its associated block have not been selected and, hence, switching noise due to the switching operation does not effect the image signals Va. This, coupled with the fact that the image signals are isolated from switching noise attributable to the switches SW, contributes a great deal to the increase in the S/N ratio of the image signals Va.

It will be noted that this particular embodiment is practicable with a number n which is not a multiple of 4 and, also, with a number of block groups which is not 4.

In summary, it will be seen that the present invention provides an image reader for an image processing apparatus in which blocks of light-sensitive cells are further divided into a plurality of groups, output terminals of selection switch are commonly connected group by group, the commonly connected output terminals respectively are connected to different input terminals of differential amplifiers, and a block which belongs to a group different from a group to which a block to be read belongs is selected simultaneously with the latter by selection switches. The image reader with such a construction frees image signals from switching noise due to the actions of switches which respectively are associated with the cells, thereby fulfilling the function with an excellent S/N ratio.

Various modifications will become possible for those skilled in the art after receiving the teachings of the present disclosure without departing from the scope thereof.

What is claimed is:

1. An image reader for an image processing apparatus in which an array of light-sensitive cells arranged in a line image sensor are divided into a predetermined number of blocks and the blocks are divided into at least a first group and a second group in the order of arrangement, the blocks being sequentially selected and driven, said image reader comprising:

a plurality of block selector means, one for each block associated in one-to-one correspondence with each of said blocks for selecting one of the selected blocks in each of the groups and sequentially driving the cells in the selected block;

a first common terminal to which output terminals of all the block selector means which belong to the first group are commonly connected;

a second common terminal to which output terminals of all the block selector means which belong to the second group are commonly connected;

a first differential amplifier having a non-inverting input terminal connecting to said first common terminal and an inverting input terminal connecting to said second common terminal, thereby producing a first output by subtracting an output of the second group from an output of the first group;

a second differential amplifier having a non-inverting input terminal connecting to the second common terminal and an inverting input terminal connecting to the first common terminal, thereby producing a second output by subtracting an output of the first group from an output of the second group; and output selector means for exclusively selecting one of the first and second outputs to deliver the selected output as an image signal, the block selector means being constructed to simultaneously select one of the blocks and another block which is different in group from said one block for reading out image signals, whereby switching noise is removed.

2. An image reader as claimed in claim 1, wherein each of the first and second groups comprises the blocks which are alternately selected in the order of arrangement of the blocks, the block selector means being constructed to simultaneously select and drive two of the blocks which neighbor each other with respect to the order of arrangement.

3. An image reader for an image processing apparatus in which an array of light-sensitive cells arranged in a line image sensor are divided into a predetermined number of blocks and the blocks are divided into at least a first group, a second group, a third group, and a fourth group in the order of arrangement, the blocks being sequentially selected and driven, said image reader comprising:

a plurality of block selector means for each of said blocks associated in one-to-one correspondence with each of said blocks for selecting one of the selected blocks of the groups and sequentially driving the cells in the selected block;

a first common terminal to which output terminals of all of the block selector means belonging to the first group are commonly connected;

a second common terminal to which output terminals of all the block selector means belonging to the second group are connected;

a third common terminal to which output terminals of all the block selector means belonging to the third group are connected;

a fourth common terminal to which output terminals of all the block selector means belonging to the fourth group are connected;

a first differential amplifier having a first input terminal connecting to said first common terminal and a second input terminal connecting to said second common terminal, thereby producing a first output by subtracting an output of the second group from an output of the first group and a second output by subtracting an output of the first group from an output of the second group;

a second differential amplifier having a first input terminal connecting to said third common terminal and a second input terminal connecting to said fourth common terminal, thereby producing a third output by subtracting an output of the fourth group from an output of the third group and a fourth output by subtracting an output of the third group from an output of the fourth group; and output selector means for exclusively selecting one of the first thru the fourth outputs to deliver the first thru the fourth outputs as image signals, said block selector means being constructed to switch the blocks belonging to the third group and fourth group while the blocks belonging to the first group and the second group are selected to read out image signals, and to switch the blocks belonging to the first group and the second group while the blocks belonging to the third group and the fourth group are selected to read out image signals, whereby noise due to switching is removed.

4. An image reader as claimed in claim 3, wherein the first group comprises blocks to which numbers which are divisible by 4 with remainder 1 are assigned in the order of arrangement, the second group comprises blocks to which numbers which are divisible by 4 with remainder 2 are assigned, the third group comprises blocks to which numbers which are divisible by 4 with remainder 3 are assigned, and the fourth comprises blocks to which numbers which are divisible by 4 with remainder 0 are assigned.

* * * * *